(12) United States Patent
Zehner et al.

(10) Patent No.: US 6,784,216 B1
(45) Date of Patent: Aug. 31, 2004

(54) ABS FOAM AND METHOD OF MAKING SAME

(75) Inventors: Burch E. Zehner, Gahanna, OH (US); Steven R. Ross, Granville, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 10/407,313

(22) Filed: Apr. 4, 2003

Related U.S. Application Data

(63) Continuation-in-part of application No. 10/127,353, filed on Apr. 22, 2002, now abandoned, which is a continuation of application No. 09/562,701, filed on Apr. 28, 2000, now abandoned.

(60) Provisional application No. 60/131,367, filed on Apr. 28, 1999.

(51) Int. Cl.$^7$ .................................................. C08J 9/00

(52) U.S. Cl. ...................... 521/84.1; 521/139; 521/140; 521/147; 521/148

(58) Field of Search ................................ 521/84.1, 139, 521/140, 147, 148

(56) References Cited

U.S. PATENT DOCUMENTS

| | | | |
|---|---|---|---|
| 4,152,495 A | 5/1979 | Labar | 521/134 |
| 4,695,594 A | 9/1987 | Pressman | 521/92 |
| 4,737,532 A | 4/1988 | Fujita et al. | 524/13 |
| 4,783,493 A | 11/1988 | Motegi et al. | 524/13 |
| 5,474,722 A | 12/1995 | Woodhams | 264/45.3 |
| 5,508,103 A | 4/1996 | Cope | 428/318.8 |
| 5,527,244 A | 6/1996 | Waller et al. | 482/47 |
| 5,574,094 A | 11/1996 | Malucelli et al. | 525/54.3 |
| 5,847,016 A | 12/1998 | Cope | 521/84.1 |
| 5,883,191 A | 3/1999 | Hughes | 525/85 |
| 5,965,075 A | 10/1999 | Pauley et al. | 264/176.1 |
| 6,054,207 A | 4/2000 | Finley | 428/317.9 |
| 6,133,349 A | 10/2000 | Hughes | 524/13 |
| 6,167,657 B1 | 1/2001 | Burge et al. | 49/496.1 |
| 6,280,667 B1 | 8/2001 | Koenig et al. | 264/68 |
| 6,342,172 B1 | 1/2002 | Finley | 264/45.3 |
| 6,357,197 B1 | 3/2002 | Serino et al. | 52/738.1 |
| 6,360,489 B1 | 3/2002 | Burge et al. | 49/496.1 |
| 2003/0096094 A1 | 5/2003 | Hayduke | 428/292.4 |

*Primary Examiner*—Morton Foelak
(74) *Attorney, Agent, or Firm*—Standley Law Group LLP

(57) ABSTRACT

The present invention is an ABS foam composition. The composition is comprised of ABS, a foam modifier, and a blowing agent. The composition may be formed into a variety of shapes and products using many different processing techniques, e.g., extrusion and molding.

27 Claims, 1 Drawing Sheet

ABS FOAM AND METHOD OF MAKING SAME

This is a continuation-in-part of U.S. application Ser. No. 10/127,353, filed Apr. 22, 2002 now abandoned, which is a continuation of U.S. application Ser. No. 09/562,701, filed Apr. 28, 2000, abandoned, which claims the benefit of U.S. Provisional Application No. 60/131,367, filed Apr. 28, 1999, each of which is hereby incorporated by reference in its entirety.

BACKGROUND AND SUMMARY OF THE INVENTION

The present invention relates generally to acrylonitrile butadiene styrene (ABS) foam, and more particularly, to an ABS foam composition and methods for its manufacture. The ABS foam composition of the present invention may be formed into a variety of shapes and products using many different processing techniques, e.g., extrusion and molding. For example, the ABS foam composition may be extruded and used as a foam stop for windows. The present invention will be described primarily with regard to using the ABS foam composition as a foam stop. However, it should be recognized that the ABS foam composition of the present invention may be used in other appropriate applications.

A foam stop is typically located adjacent to the jamb liner of a window. Rigid polyvinyl chloride (RPVC) foam has commonly been used to make foam stops for windows. However, RPVC foam may be relatively expensive, and it may not provide desired physical characteristics.

In light of the shortcomings of RPVC foam, a need exists for an improved composition that may be used to make foam stops and other articles. In particular, a need exists for a relatively inexpensive composition that may be used to make foam stops and other articles. A need also exists for a composition that provides improved physical characteristics as compared to RPVC foam.

The present invention satisfies some or all of these needs. An exemplary embodiment of the ABS foam composition of the present invention is comprised of about 100.0 parts of ABS, about 2.0 to about 10.0 parts of a foam modifier, and about 0.5 to about 2.0 parts of a blowing agent. The foaming agent is preferably adapted to decrease the foam density and increase the foam swell of the composition. In an exemplary embodiment of the present invention, the ABS, the foam modifier, and the blowing agent are combined together and then extruded in the desired shape of a product.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

Figure 1:
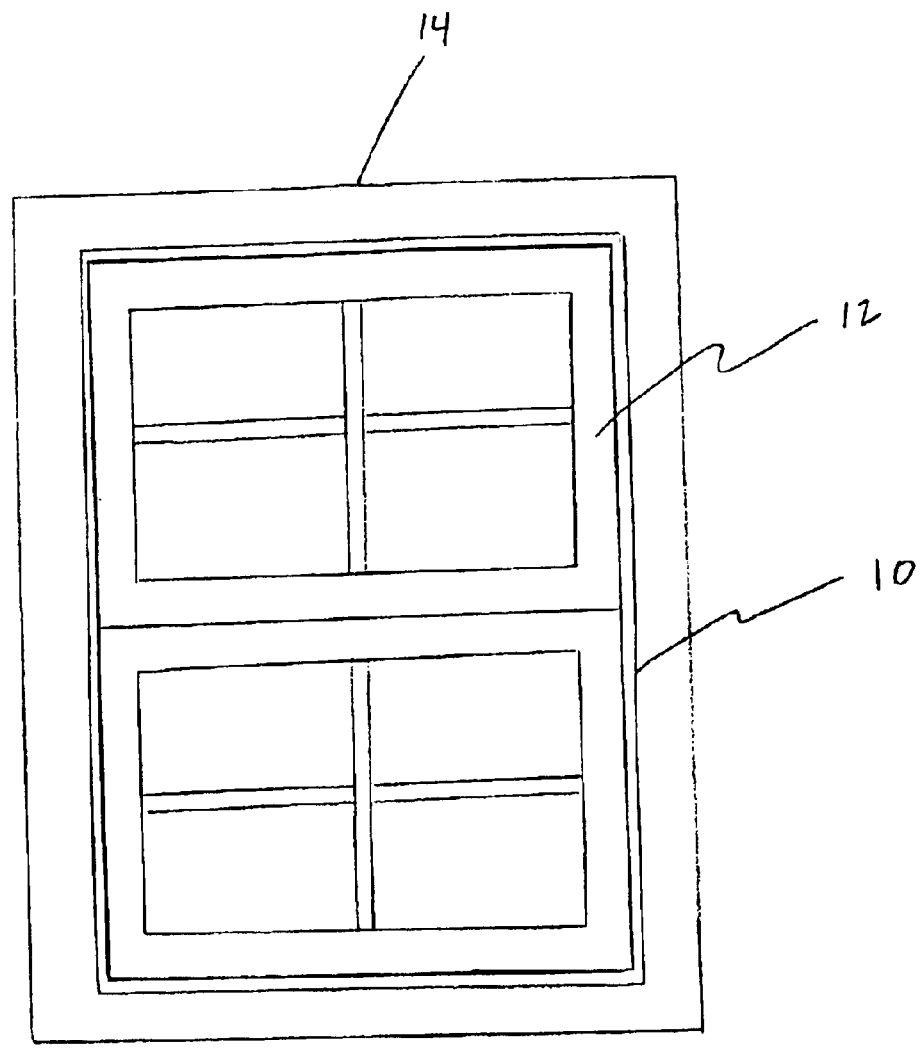
FIG. 1 is a side elevation view of one application of the ABS foam of the present invention.

The present invention is directed to an ABS foam and methods for its manufacture. FIG. 1 shows an exemplary use of the ABS foam. In this example, a strip of ABS foam 10 is placed approximately adjacent to the jamb liner for the window 12. As shown in FIG. 1, the window 12 may be a double-hung window. The strip of ABS foam 10 may extend completely around the window frame 14.

As mentioned above, the ABS foam may be suitable for a wide variety of applications not limited to foam stops for windows. For example, the ABS foam may be used to make other window components, moldings, lineals, and accessories. The ABS foam may also be useful for making siding components, siding accessories, interior and exterior decorative house moldings, picture frames, furniture components, deck components, deck railings, door components, roof components, fence components, fence posts, fence rails, floor components, and other similar or suitable indoor and outdoor items. In addition, an ABS foam composition of the present invention may also be used to make other types of products that are commonly made from wood, synthetic wood, metal, or plastic.

The ABS foam composition of the present invention may be comprised of about 100 parts of ABS, about 0.5 to about 2.0 parts of a blowing agent, and about 2.0 to about 10.0 parts of a foam modifier. In one exemplary embodiment, the ABS foam composition of the present invention may be comprised of about 100 parts of ABS, about 0.75 to about 1.5 parts of a blowing agent, and about 3.0 to about 7.0 parts of a foam modifier. An example of the ABS foam composition is comprised of about 100 parts of ABS, about 1 part of a blowing agent, and about 4 parts of a foam modifier.

An example of ABS that may be used in the present invention is Bayer 433-1050. Bayer is located in Pittsburgh, Pa. Those skilled in the art should recognize that other suitable types of ABS may be utilized in the present invention.

Blowing agents are well known in the art. The blowing agent may be an endothermic chemical foaming agent. Examples of an endothermic blowing agent include hydrocerol, sodium bicarbonate, and other similar or suitable materials. Hydrocerol is available from Boehringer Ingelheim in Petersburg, Va. The blowing agent may also be a combination of endothermic and exothermic (e.g., azodicarbonamide and other similar or suitable materials). Based on the description of the present invention, those skilled in the art should recognize that other suitable blowing agents may be utilized in thee present invention.

The foam modifier is preferably adapted to decrease the foam density and increase the foam swell of the composition as compared to processing without the foam modifier. The foam modifier may also make the composition easier to process, e.g., extrude. An example of the foam modifier is an acrylic modifier (e.g., a high molecular weight acrylic modifier) which is commonly designed for use with RPVC foam. For instance, the foam modifier may be K415, which is available from Rohm and Haas in Philadelphia, Pa. Nevertheless, based on the description of the present invention, those skilled in the art should recognize that other acrylic modifiers that are commonly designed for use with RPVC foam may be utilized in the present invention. The foam modifier may also be any other suitable material that is adapted to decrease the foam density and increase the foam swell of the composition. For example, the foam modifier may be styrene-acrylonitrile polymer (SAN) such as high molecular weight SAN and other similar or suitable materials.

It is appreciated that the ABS foam composition of the present invention may include other ingredients. For instance, the ABS foam composition may also include ingredients including, but not limited to, cellulosic materials, inorganic fillers, cross-linking agents, process lubricants, accelerators, inhibitors, enhancers, compatibilizers, and other plastics, polymers, copolymers, and thermoplastics. In addition, the ABS foam composition may include other suitable materials for the application. Examples of cellulosic materials include sawdust, newspapers, alfalfa, wheat pulp, wood chips, wood fibers, wood particles, ground wood, wood flour, wood flakes, wood veneers, wood laminates, paper, cardboard, straw, cotton, flax, rice hulls, coconut shells, peanut shells, bagasse, plant fibers, bamboo fiber, palm fiber, kenaf, and other similar materials. An exemplary embodiment of the present invention may use 40 to 100 mesh wood flour. Of course, other embodiments of the present invention may use other sizes of wood flour. Examples of polymers include multilayer films, high density polyethylene (HDPE), low density polyethylene (LDPE), polypropylene (PP), polyvinyl chloride (PVC), chlorinated polyvinyl chloride (CPVC), ethyl vinyl acetate (EVA), polystyrene, other similar copolymers, other similar plastic materials, and formulations that incorporate any of the aforementioned polymers. Examples of inorganic fillers include talc, calcium carbonate, kaolin clay, magnesium oxide, titanium dioxide, silica, mica, barium sulfate, and other similar materials. Examples of cross-linking agents include polyurethanes, such as isocyanates, phenolic resins, unsaturated polyesters, and epoxy resins. Combinations of the aforementioned materials are also examples of cross-linking agents. In addition, examples of lubricants include zinc stearate, wax, ethylene bis stearamide (EBS), calcium stearate, and other similar or suitable materials.

For example, an ABS foam composition of the present invention may be filled with cellulosic material. The cellulosic material may enhance the physical characteristics of the foam composition such as strength, rigidity, and/or durability. One exemplary embodiment of a cellulosic-filled ABS foam composition may be comprised of about 100 parts of ABS, about 10 to about 80 parts of cellulosic material, about 2 to about 10 parts of foam modifier, about 0.5 to about 2 parts of blowing agent, and optionally about 1 to about 4 parts of lubricant. More preferably, this embodiment of the cellulosic-filled ABS foam composition may be comprised of about 100 parts of ABS, about 25 to about 50 parts of cellulosic material, about 3 to about 7 parts of foam modifier, about 0.75 to about 1.5 parts of blowing agent, and optionally about 2 to about 3 parts of lubricant.

Another exemplary embodiment of a cellulosic-filled ABS foam composition may be comprised of cellulosic material in an amount of about 10% to about 50% by weight and an ABS compound in an amount of about 50% to about 90% by weight. More preferably, this embodiment of the cellulosic-filled ABS foam composition may be comprised of cellulosic material in an amount of about 20% to about 30% by weight and an ABS compound in an amount of about 70% to about 80% by weight. Examples of the ABS compound are set forth above.

For applications where the ABS foam composition will be exposed to the environment, the ABS foam may be capped with a weatherable material. For example, the ABS foam composition may be coextruded with a rigid polyvinyl chloride (RPVC) cap stock.

The ABS foam composition of the present invention may have a higher softening temperature than a RPVC foam composition. More particularly, ABS has a higher softening temperature than RPVC. For example, testing under ASTM D-648 at 264 PSI showed that RPVC had a softening temperature of about 160° Fahrenheit whereas an exemplary embodiment of ABS had a softening temperature of about 185° Fahrenheit. Consequently, an ABS foam composition of the present invention may maintain its shape at a higher temperature than RPVC foam.

The ingredients and manufacturing process may be selected to achieve an ABS foam composition that has any desired specific gravity. For example, one embodiment of the ABS foam composition may have a specific gravity between about 0.30 and about 0.60, more specifically between about 0.34 and about 0.55, and even more specifically between about 0.47 and about 0.52. However, it is appreciated that the ABS foam composition of the present invention may have a specific gravity outside of this range, e.g., a specific gravity between about 0.60 and 1.0.

Any suitable manufacturing process including, but not limited to, extrusion and molding may be used to make the composition of the present invention. The manufacturing process may be selected and varied to obtain the desired characteristics for each application. For instance, in order to obtain optimal distribution of the blowing agent, foam modifier, and/or other ingredients, these materials may be added to the composition by a dosing unit on line. This may help to prevent these materials from settling to the bottom of the hopper during tumbling. Also, the blending temperatures, times, and speeds as well as the ingredients may be varied to obtain the desired characteristics, e.g., specific gravity, softening point, shrinkage point, swell, durability, and rigidity, of the composition.

EXAMPLE

Two samples of the ABS foam composition of the present invention were produced for one test. The composition was comprised of 100 parts of Bayer 433-1050 pellets, 1 part of a blowing agent, and 4 parts of K415. These materials were tumbled together for approximately 0.5 hours and then extruded under the following conditions:

|  | First Sample | Second Sample |
| --- | --- | --- |
| Barrel Zone #1 | 329° F. | 314° F. |
| Barrel Zone #2 | 337° F. | 315° F. |
| Barrel Zone #3 | 330° F. | 315° F. |
| Barrel Zone #4 | 331° F. | 315° F. |
| Barrel Zone #5 | 329° F. | 321° F. |
| Gate | 334° F. | 326° F. |
| Adapter | 350° F. | 350° F. |
| Die Top | 350° F. | 350° F. |
| Die Bottom | 350° F. | 350° F. |
| Die East | 350° F. | 350° F. |
| Die West | 345° F. | 350° F. |
| RPM | 5 | 7 |
| Feet/Minute | 5 | 5 |
| Specific Gravity | 0.34 | 0.47 |
| Shrinkage @ 170° F. | 0% | 0% |

As shown, the test successfully yielded a first sample of products having a 0.34 specific gravity and a second sample of products having a 0.47 specific gravity.

In another test, samples of four different ABS compositions were produced and tested for torque, pressure, output, specific gravity, and swell. For each sample, a single screw extruder operating at 60 RPM forced the composition through a rod die to make the samples. Commercial grade ABS/wood composite pellets were used in each sample. For the first sample, the ABS/wood composite pellets were extruded without the addition of any blowing agent or foam modifier. Sodium bicarbonate (a blowing agent—i.e., BA) was added to the ABS/wood composite pellets at 2 parts per 100 parts of ABS resin (i.e., pph) for the second sample. For the third sample, the ABS/wood composite pellets were mixed with sodium bicarbonate in an amount of 3 pph. Finally, for the fourth sample, sodium bicarbonate was added in an amount of 3 pph and Rohm and Haas K-400 (a foam modifier—i.e., FM) was added in an amount of 5 pph to the ABS/wood composite pellets. The test results are shown in the below chart.

| Sample | Ingredients | Torque | PSI | % Swell | Spec. Grav. | Gr/Rate |
|---|---|---|---|---|---|---|
| 1 | Pellet | 4850 | 630 | 39 | 0.67 | 33.76 |
| 2 | Pellet 2 pph BA | 3700 | 540 | 31 | 0.70 | 31.04 |
| 3 | Pellet 3 pph BA | 3400 | 450 | 33 | 0.66 | 33.58 |
| 4 | Pellet 3 pph BA 5 pph FM | 4800 | 590 | 111 | 0.41 | 28.84 |

The results of the test showed that the ABS/wood composite pellets did not have enough strength to free foam (i.e., foam with only the addition of a blowing agent). The first sample had a slightly rough surface and 39% swell. The addition of blowing agent in the second sample improved the surface appearance and decreased the torque and pressure. Surprisingly, the blowing agent also decreased the swell and increased the specific gravity. Increasing the blowing agent to 3 pph in the third sample further decreased the torque and pressure. The surface appearance stayed smooth and specific gravity slightly lowered, but there was not much foaming. The addition of the foam modifier provided surprisingly improved results. The addition of the foam modifier allowed the ABS/wood composite to capture more of the blowing agent. The torque and pressure dramatically increased. Moreover, the swell more than tripled, and the specific gravity significantly dropped. As a result, the test showed that the addition of the foam modifier surprisingly improved the foaming of the ABS/wood composite.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A cellulosic-filled composition comprising:
   about 100 parts of ABS;
   about 2.0 to about 10.0 parts of foam modifier adapted to decrease the density and increase the swell of said composition; and
   about 0.5 to about 2.0 parts of blowing agent.

2. The cellulosic-filled composition of claim 1 wherein said foam modifier is present in an amount of about 3.0 to about 7.0 parts.

3. The cellulosic-filled composition of claim 2 wherein said foam modifier is present in an amount of about 4 parts.

4. The cellulosic-filled composition of claim 1 wherein said foam modifier is an acrylic foam modifier.

5. The cellulosic-filled composition of claim 1 wherein said foam modifier is styrene-acrylonitrile polymer.

6. The cellulosic-filled composition of claim 1 wherein said blowing agent is present in an amount of about 0.75 to about 1.5 parts.

7. The cellulosic-filled composition of claim 6 wherein said blowing agent is present in an amount of about 1 part.

8. The cellulosic-filled composition of claim 1 wherein said blowing agent is hydrocerol.

9. The cellulosic-filled composition of claim 1 wherein cellulosic material is present in an amount of 10 to about 80 parts.

10. The cellulosic-filled composition of claim 9 wherein said cellulosic material is present in an amount of about 25 to about 50 parts.

11. The cellulosic-filled composition of claim 1 further comprising lubricant in an amount of about 1 to about 4 parts.

12. The cellulosic-filled composition of claim 11 wherein said lubricant is present in an amount of about 2 to about 3 parts.

13. A cellulosic-filled composition comprising:
    about 100 parts of ABS;
    about 10 to about 80 parts of cellulosic material;
    about 2.0 to about 10.0 parts of foam modifier adapted to decrease the density and increase the swell of said composition;
    about 1 to about 4 parts of lubricant; and
    about 0.5 to about 2.0 parts of blowing agent.

14. The cellulosic-filled composition of claim 13 wherein said cellulosic material is present in an amount of about 25 to about 50 parts.

15. The cellulosic-filled composition of claim 13 wherein said foam modifier is present in an amount of about 3.0 to about 7.0 parts.

16. The cellulosic-filled composition of claim 13 wherein said lubricant is present in an amount of about 2 to about 3 parts.

17. The cellulosic-filled composition of claim 13 wherein said blowing agent is present in an amount of about 0.75 to about 1.5 parts.

18. The cellulosic-filled composition of claim 13 wherein:
    said cellulosic material is in an amount of about 25 to about 50 parts;
    said foam modifier is in an amount of about 3 to about 7 parts;
    said lubricant is in an amount of about 2 to about 3 parts; and
    said blowing agent is in an amount of about 0.75 to about 1.5 parts.

19. The cellulosic-filled composition of claim 13 wherein said foam modifier is an acrylic foam modifier.

20. The cellulosic-filled composition of claim 13 wherein said foam modifier is high molecular weight styrene-acrylonitrile polymer.

21. A component made from a composition, said composition comprising:
    about 100 parts of ABS;
    about 10 to about 80 parts of cellulosic material;
    about 2.0 to about 10.0 parts of foam modifier adapted to decrease the density and increase the swell of said composition;
    about 1 to about 4 parts of lubricant; and
    about 0.5 to about 2.0 parts of blowing agent.

22. The component of claim 21 wherein said component is selected from the group consisting of foam stops for windows, window components, window moldings, window lineals, window accessories, siding components, siding accessories, interior and exterior decorative house moldings, picture frames, furniture components, deck components, deck railings, door components, roof components, fence components, fence posts, fence rails, and floor components.

23. The component of claim 22 wherein said component is a deck component.

24. The component of claim 22 wherein said component is a fence component.

25. The component of claim 22 wherein said component is a deck rail.

26. The component of claim 22 wherein said component is a window component.

27. The component of claim 22 wherein said component is a siding component.

\* \* \* \* \*